(12) United States Patent
Horiguchi et al.

(10) Patent No.: US 11,511,567 B2
(45) Date of Patent: Nov. 29, 2022

(54) TYRE

(71) Applicant: SUMITOMO RUBBER INDUSTRIES, LTD., Hyogo (JP)

(72) Inventors: Toshiki Horiguchi, Hyogo (JP); Yoshiaki Kanematsu, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 818 days.

(21) Appl. No.: 16/378,671

(22) Filed: Apr. 9, 2019

(65) Prior Publication Data
US 2019/0329599 A1 Oct. 31, 2019

(30) Foreign Application Priority Data

Apr. 26, 2018 (JP) .............................. JP2018-085562

(51) Int. Cl.
*B60C 11/13* (2006.01)
*B60C 11/12* (2006.01)
*B60C 11/03* (2006.01)

(52) U.S. Cl.
CPC ...... *B60C 11/1263* (2013.01); *B60C 11/1204* (2013.01); *B60C 11/1236* (2013.01);
(Continued)

(58) Field of Classification Search
CPC ......... B60C 11/1369; B60C 2011/0381; B60C 2011/0383
See application file for complete search history.

(56) References Cited

U.S. PATENT DOCUMENTS 4,223,712 A * 9/1980 Iwata ...................... B60C 9/20
152/154.2
D288,917 S * 3/1987 Wallet ................. B60C 11/0304
D12/600
(Continued)

FOREIGN PATENT DOCUMENTS

EP 0602989 * 6/1994
EP 2610082 A2 7/2013
(Continued)

OTHER PUBLICATIONS

English machine translation of JPH04-230407. (Year: 1992).*
(Continued)

*Primary Examiner* — Robert C Dye
(74) *Attorney, Agent, or Firm* — Greenblum & Bernstein, P.L.C.

(57) ABSTRACT

A tyre comprises a tread portion having a land region including a ground contacting surface defined between a first vertical edge and a second vertical edge and a lateral groove including a first portion extending from the first vertical edge, a second portion extending from the second vertical edge, and a connection portion connecting therebetween. The connection portion is a portion between a first small edge protruding circumferentially from the first portion and a second small edge protruding toward a circumferentially opposite side to the first small edge. A length in the tyre circumferential direction of each of the first and second small edges is smaller than a maximum groove width of each of the first and second portions. At least a part of the connection portion has a raised bottom portion having a depth smaller than that of the lateral groove at the first and second vertical edges.

16 Claims, 8 Drawing Sheets

(52) U.S. Cl.
CPC ....... B60C 11/1369 (2013.01); *B60C 11/0306* (2013.01); *B60C 2011/0353* (2013.01); *B60C 2011/0365* (2013.01); *B60C 2011/0369* (2013.01); *B60C 2011/0372* (2013.01); *B60C 2011/0381* (2013.01); *B60C 2011/0383* (2013.01); *B60C 2011/1209* (2013.01); *B60C 2011/1213* (2013.01); *B60C 2011/1268* (2013.01)

(56) References Cited

U.S. PATENT DOCUMENTS

| | | | |
|---|---|---|---|
| 5,407,005 A | | 4/1995 | Consolacion et al. |
| 2013/0180638 A1* | | 7/2013 | Washizuka .......... B60C 11/0311 152/209.8 |
| 2014/0230979 A1* | | 8/2014 | Matsuda ............. B60C 11/0304 152/209.18 |
| 2016/0185160 A1* | | 6/2016 | Mukai ................. B60C 11/1307 152/209.24 |
| 2016/0368326 A1* | | 12/2016 | Wakizono ........... B60C 11/0304 |
| 2019/0023080 A1* | | 1/2019 | Yamakawa ............. B60C 11/01 |

FOREIGN PATENT DOCUMENTS

| | | | |
|---|---|---|---|
| JP | H04-230407 | * | 8/1992 |
| JP | H08-067112 | * | 3/1996 |
| JP | 2015-13604 A | | 1/2015 |
| WO | 2017141914 A1 | | 8/2017 |
| WO | 2018131229 A1 | | 7/2018 |

OTHER PUBLICATIONS

English machine translation of JPH08-067112. (Year: 1996).*
European Search Report, European patent Office, Application No. 19167489.4, dated Aug. 13, 2019, 9 pages.

* cited by examiner

TYRE

TECHNICAL FIELD

The present invention relates to a tyre, and in particular, to a tyre which can be used suitably as an all-season tyre.

BACKGROUND ART

For all-season tyres, basic running performance not only on a dry road surface but also on a snowy road surface is required. In order to improve on-snow performance, providing a tread portion with a lot of lateral grooves is effective. The lateral grooves generate on-snow traction (snow shearing force) by compacting snow on a road surface in the lateral grooves and then shearing it. Further, edges of the lateral grooves generate frictional force by scratching the compacted snow on a road surface. As a related technology, there is a tyre disclosed in Japanese Unexamined Patent Application Publication No. 2015-013604.

SUMMARY OF THE INVENTION

The lateral grooves provided in the tread portion are useful for improving the on-snow traction, but improvement on cornering performance on a snowy road surface is not sufficient, and further improvement is demanded. Further, the lateral grooves tend to deteriorate pattern rigidity of the tread portion, and eventually to deteriorate steering stability on a dry road surface.

The present invention was made in view of the above, and a primary object thereof is to provide a tyre capable of improving the steering stability on a dry road surface and the on-snow performance.

In one aspect of the present invention, a tyre comprises a tread portion, wherein the tread portion is provided with a first vertical edge extending in a tyre circumferential direction, a second vertical edge extending in the tyre circumferential direction, and a land region including a ground contacting surface defined between the first vertical edge and the second vertical edge, the land region is provided with a lateral groove extending so as to connect between the first vertical edge and the second vertical edge, the lateral groove includes a first portion extending from the first vertical edge, a second portion extending from the second vertical edge, and a connection portion connecting the first portion and the second portion, the connection portion is a portion between a first small edge and a second small edge, the first small edge protrudes in the tyre circumferential direction from the first portion, the second small edge protrudes toward an opposite side to the first small edge in the tyre circumferential direction, a length in the tyre circumferential direction of each of the first small edge and the second small edge is smaller than a maximum groove width of the first portion and a maximum groove width of the second portion, and the connection portion has, in at least a part thereof, a raised bottom portion having a depth smaller than a depth at the first vertical edge and a depth at the second vertical edge of the lateral groove.

In another aspect of the invention, it is preferred that the land region is arranged between a tyre equator and a tread edge, and the connection portion is positioned on a side of the tread edge of a center position in a tyre axial direction of the land region.

In another aspect of the invention, it is preferred that the first portion has, in at least a part thereof, a depth equal to that of the raised bottom portion.

In another aspect of the invention, it is preferred that the land region is provided with a short groove extending from the second vertical edge and terminating within the land region.

In another aspect of the invention, it is preferred that the short groove terminates at a position on a side of the second vertical edge of a center position in a tyre axial direction of the land region.

In another aspect of the invention, it is preferred that the short groove has a depth gradually decreasing from an end thereof on a side of the second vertical edge toward a terminating end thereof terminating within the land region.

In another aspect of the invention, it is preferred that the land region is provided with sipes each extending so as to connect between the first vertical edge and the second vertical edge.

In another aspect of the invention, it is preferred that each of the sipes includes a main body portion and a shallow bottom portion having a depth smaller than that of the main body portion.

In another aspect of the invention, it is preferred that the land region is provided with a plurality of kinds of the sipes having different positions in a tyre axial direction of the shallow bottom portions.

In another aspect of the invention, it is preferred that the first small edge and a groove edge of the second portion is connected by an arcuate portion convex toward an outer side of the lateral groove, and the second small edge and a groove edge of the first portion is connected by an arcuate portion convex toward an outer side of the lateral groove.

DESCRIPTION OF THE PREFERRED EMBODIMENT

An embodiment of the present invention will now be described below in detail in conjunction with accompanying drawings.

Figure 1:
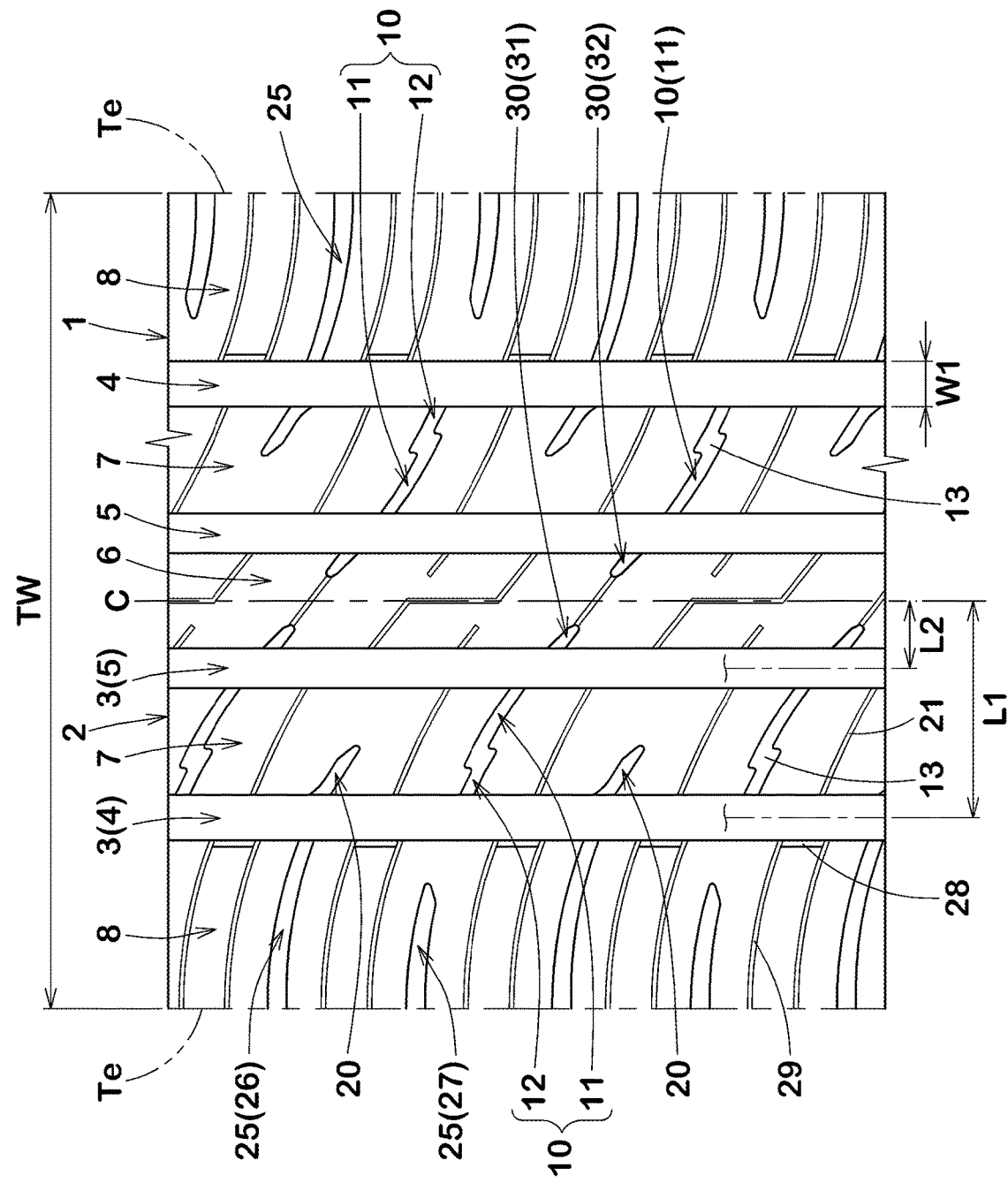
FIG. 1 is a development view of a tread portion of a pneumatic tyre as an embodiment of the present invention.

FIG. 1 is a development view of a tread portion 2 of a tyre 1 showing an embodiment of the present invention. The tyre 1 in this embodiment is configured as a pneumatic tyre. In this embodiment, as a preferred embodiment, an all-season tyre intended to be mounted on a passenger car or an suV is shown. A position of the tread portion 2 of the tyre 1 in this embodiment when it is mounted on a vehicle is not specified, the tread portion 2 has a point symmetrical pattern with respect to a point on a tyre equator (C), for example. However, the present invention is not limited to such an embodiment.

As shown in FIG. 1, the tread portion 2 is provided with a plurality of main grooves 3 extending in a tyre circumferential direction. The main grooves 3 include shoulder main grooves 4 each arranged on a side of a respective one of tread edges (Te), and crown main grooves 5 each arranged on a side of the tyre equator (C) of a respective one of the shoulder main grooves 4, for example.

The tread edges (Te) are defined as outermost ground contacting positions in a tyre axial direction when the tyre 1 in a standard state is in contact with a flat surface with zero camber angle by being loaded with a standard tyre load. The standard state is a state in which the tyre is mounted on a standard rim, inflated to a standard inner pressure, and loaded with no tyre load. Dimensions and the like of various parts of the tyre are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 in this embodiment is provided with two shoulder main grooves 4. In each of the shoulder main grooves 4, a distance L1 in the tyre axial direction between a groove center line thereof and the tyre equator (C) is in a range of from 0.20 to 0.30 times a tread width TW, for example. Note that the tread width TW is a distance in the tyre axial direction between the tread edges (Te) of the tyre 1 in the standard state.

Each of the crown main grooves 5 in this embodiment is provided between a respective one of the shoulder main grooves 4 and the tyre equator (C), for example. The tread portion 2 in this embodiment is provided with two crown main grooves 5 sandwiching the tyre equator (C). In each of the crown main grooves 5, a distance L2 in the tyre axial direction between a groove center line thereof and the tyre equator (C) is in a range of from 0.05 to 0.15 times the tread width TW, for example. Note that the present invention is not limited to such an embodiment, but in another embodiment, one crown main grooves 5 may be provided on the tyre equator (C).

Each of the main grooves 3 extends linearly, for example. Each of the main grooves 3 may extend in a zigzag manner, for example. A groove width W1 of each of the main grooves 3 is in a range of from 4.0% to 6.0% of the tread width TW, for example. A groove depth of each of the main grooves 3 is in a range of from 5.0 to 12.0 mm, for example. Thereby, the steering stability on a dry road surface and the on-snow performance are improved in a good balance.

The tread portion 2 is divided into a plurality of land regions by the main grooves 3 described above. The tread portion 2 in this embodiment is divided into a crown land region 6, two middle land regions 7, and two shoulder land regions 8. The crown land region 6 is defined between the two crown main grooves 5 and is arranged on the tyre equator (C). Each of the middle land regions 7 is defined between a respective one of the crown main grooves 5 and its adjacent one of the shoulder main grooves 4. Each of the shoulder land regions 8 is defined between a respective one of the shoulder main grooves 4 and its adjacent one of the tread edges (Te). Thereby, the tread portion 2 in this embodiment is formed by five land regions. However, in another embodiment, the tread portion 2 may be divided into four land regions by two shoulder main grooves 4 and one crown main groove 5, for example.

Figure 2:
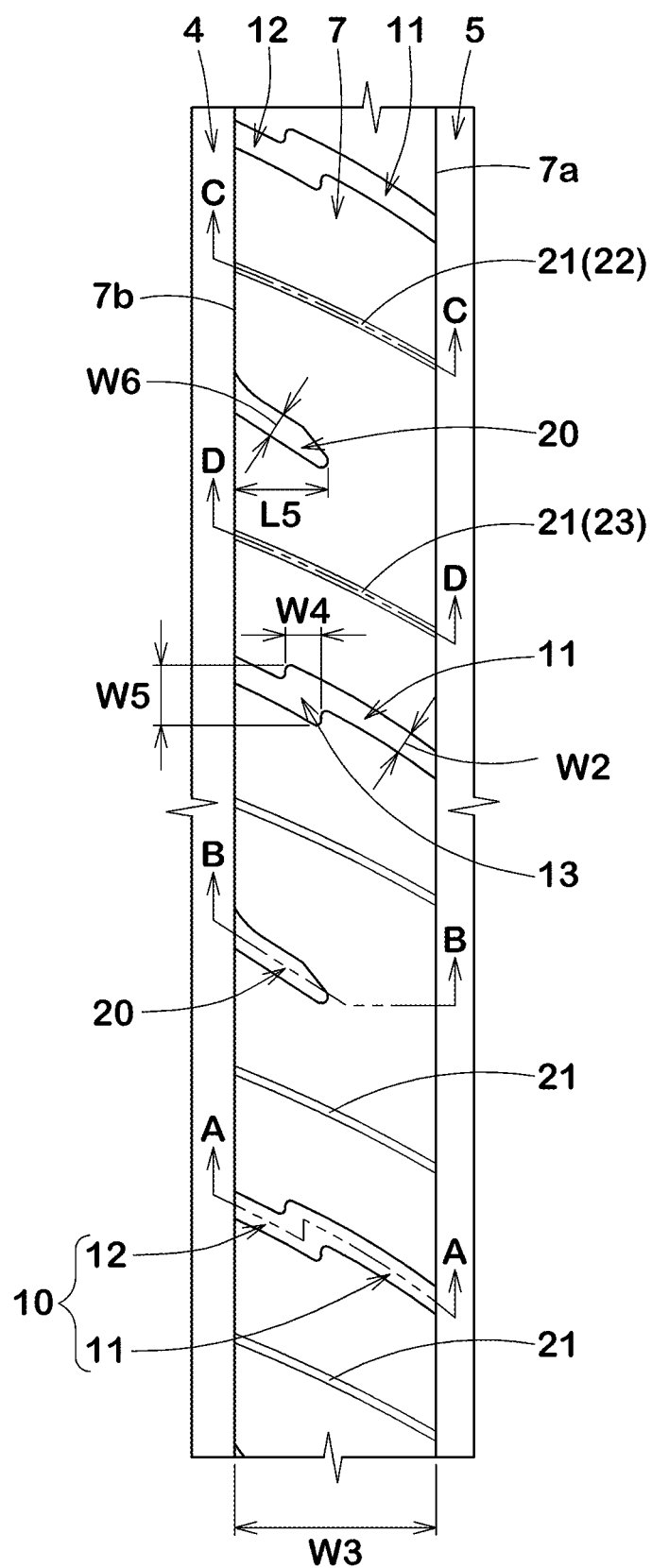
FIG. 2 is an enlarged view of one of middle land regions of FIG. 1.

FIG. 2 is an enlarged view of one of the middle land regions 7 as a figure showing an embodiment of the land region. As shown in FIG. 2, each of the middle land regions 7 has a ground contacting surface defined between a first vertical edge (7a) extending in the tyre circumferential direction and a second vertical edge (7b) extending in the tyre circumferential direction. In this embodiment, the first vertical edge (7a) is an edge on a side of the tyre equator (C) of each of the middle land regions 7. The second vertical edge (7b) is an edge on a side of a respective one of the tread edges (Te) of each of the middle land regions 7.

Each of the middle land regions 7 is provided with a plurality of lateral grooves 10 arranged in the tyre circumferential direction and each extending between the first vertical edge (7a) and the second vertical edge (7b).

Each of the lateral grooves 10 includes a first portion 11 extending from the first vertical edge (7a), a second portion 12 extending from the second vertical edge (7b), and a connection portion 13 connecting therebetween.

A groove width W2 of each of the first portion 11 is in a range of from 0.20 to 0.40 times the groove width W1 (shown in FIG. 1) of each of the main grooves 3, for example. A groove width of the second portion 12 is also the same. The first portion 11 and the second portion 12 are inclined in the same direction with respect to the tyre axial direction, for example. An angle of each of groove edges of each of the first portion 11 and the second portion 12 is in a range of from 25 to 35 degrees with respect to the tyre axial direction, for example. Further, in each of the lateral grooves 10, the first portion 11 and the second portion 12 are connected with each other in a displaced manner from each other in the tyre circumferential direction, for example. A displacement amount in the tyre circumferential direction between the first portion 11 and the second portion 12 is in a range of from 0.50 to 0.60 times the groove width of each of the first portion 11 and the second portion 12, for example.

Figure 3:
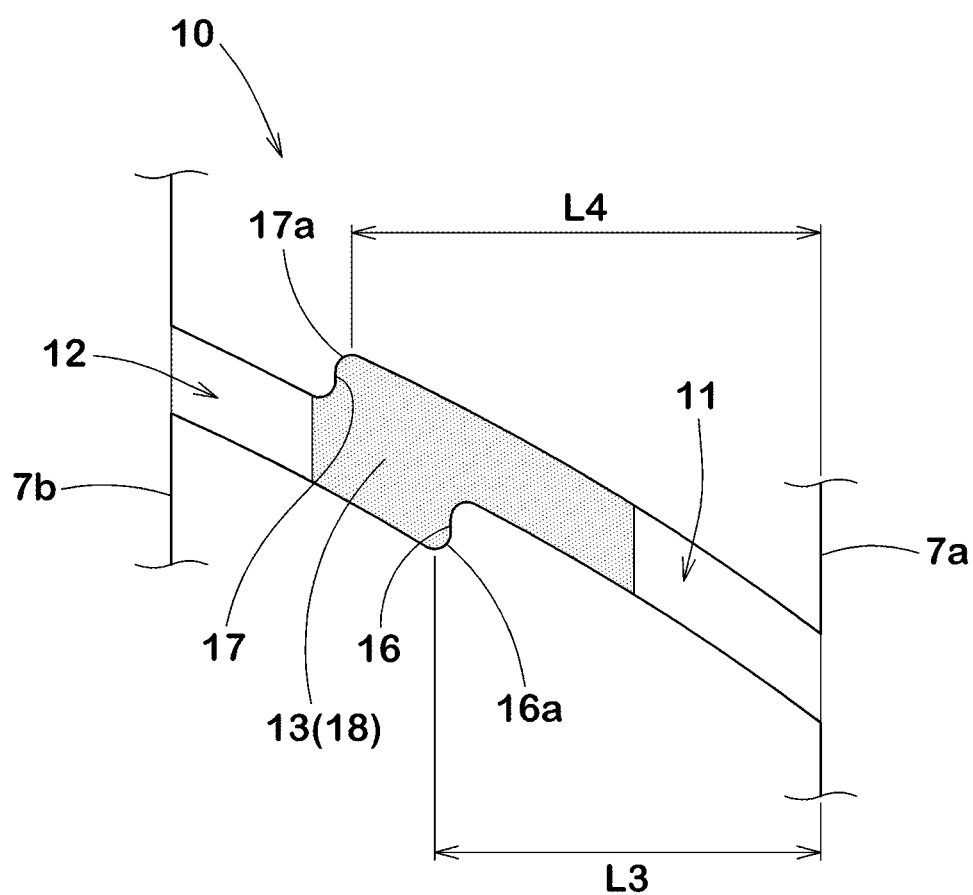
FIG. 3 is an enlarged view of one of lateral grooves of FIG. 2.

FIG. 3 is an enlarged view of one of the lateral grooves 10. As shown in FIG. 3, the connection portion 13 is a portion between a first small edge 16 protruding in the tyre circumferential direction from the first portion 11 and a second small edge 17 protruding on an opposite side to the first small edge 16 in the tyre circumferential direction. An angle of each of the first small edge 16 and the second small edge 17 with respect to the tyre circumferential direction is in a range of from 0 to 10 degrees, for example. Each of the lateral grooves 10 has the connection portion 13, therefore, each of a pair of edges of each of the lateral grooves 10 is curved in an s-shape at the connection portion 13.

The lateral grooves including the connection portions 13 configured as such not only improve the on-snow traction, but also provide frictional force in the tyre axial direction by the first small edges 16 and the second small edges 17, therefore, it is possible that the cornering performance on a snowy road surface is improved eventually.

A length in the tyre circumferential direction of each of the first small edge 16 and the second small edge 17 is smaller than a maximum groove width of the first portion 11 and a maximum groove width of the second portion 12. Thereby, decrease in rigidity of the land regions due to the connection portions 13 is suppressed.

In each of the lateral grooves 10, the connection portion 13 has, in at least a part thereof, a raised bottom portion 18 whose depth is smaller than a depth at the first vertical edge (7*a*) and a depth at the second vertical edge (7*b*).

Each of the connection portions 13 is likely to have a relatively large groove space, however, in at least a part thereof, it has the raised bottom portion 18 having the depth smaller than the depth at the first vertical edge (7*a*) and the depth at the second vertical edge (7*b*) of each of the lateral grooves 10, therefore, local decrease in the rigidity of the tread portion 2 is suppressed, thereby, the steering stability on a dry road surface is improved eventually. Note that, for ease of understanding the invention, the raised bottom portion 18 and regions having the same depth as that of the raised bottom portion 18 is shaded in FIG. 3.

Figure 4A:
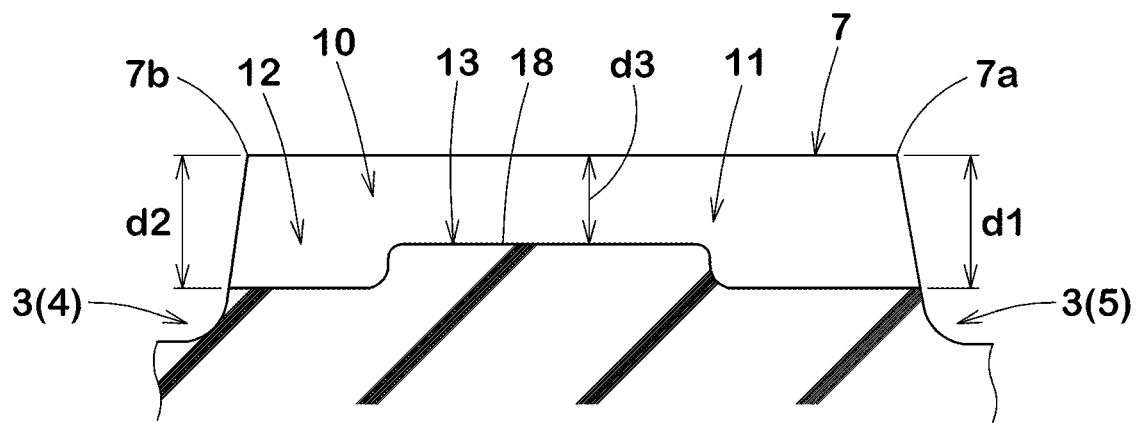
FIG. 4A is a cross-sectional view taken along A-A line of FIG. 2.

FIG. 4A is a cross-sectional view of one of the lateral grooves 10 taken along A-A line of FIG. 2. As shown in FIG. 4A, the raised bottom portion 18 is formed over the entire connection portion 13 in this embodiment. In a more preferred embodiment, the first portion 11 has the same depth in at least a part thereof as that of the raised bottom portion 18. It is possible that the lateral grooves 10 configured as such further improve the steering stability on a dry road surface.

Each of a depth (d1) at the first vertical edge (7*a*) and a depth (d2) at the second vertical edge (7*b*) of each of the lateral grooves 10 is in a range of from 0.65 to 0.75 times the depth of each of the main grooves 3. A depth (d3) of the raised bottom portion 18 is in a range of from 0.40 to 0.50 times the depth of each of the main grooves 3, for example. Further, it is preferred that the depth (d3) of the raised bottom portion 18 is in a range of from 0.60 to 0.75 times the depth (d1) of each of the lateral grooves 10.

As shown in FIG. 3, it is preferred that the connection portion 13 is positioned on a side of a respective one of the tread edges (Te) of a center position in the tyre axial direction of each of the middle land regions 7. More specifically, both of the first small edge 16 and the second small edge 17 are positioned on a side of a respective one of the tread edges (Te) of the center position. Thereby, during running on a snowy road surface, it becomes easy for snow to be discharged from the connection portion 13 by a change of ground contact pressure, therefore, excellent on-snow performance is exerted over a long period of time.

One of the groove edges of the first portion 11 and the first small edge 16 are connected by an arcuate portion which is convex toward an inner side of the groove, for example. One of the groove edges of the second portion 12 and the second small edge 17 are connected by an arcuate portion which is convex toward the inner side of the groove, for example.

Similarly, the first small edge 16 and one of the edges of the second portion 12 are connected by an arcuate portion (16*a*) which is convex toward an outer side of the groove, for example. Thereby, uneven wear of edges of the connection portion 13 is suppressed. A first portion length L3 corresponding to a distance in the tyre axial direction between the first vertical edge (7*a*) and an end of the arcuate portion (16*a*) is in a range of from 0.50 to 0.65 times a width W3 (shown in FIG. 2 and the same applies hereinafter) in the tyre axial direction of each of the middle land regions 7, for example, The second small edge 17 and one of the edges of the first portion 11 are connected by an arcuate portion (17*a*) which is convex toward the outer side of the groove, for example. A distance L4 in the tyre axial direction between the first vertical edge (7*a*) and an end of the arcuate portion (17*a*) is in a range of from 0.60 to 0.80 times the width W3 in the tyre axial direction of each of the middle land regions 7, for example.

It is preferred that a width W4 (shown in FIG. 2 and the same applies hereinafter) in the tyre axial direction of the connection portion 13 is larger than the maximum groove width of the first portion 11 and the maximum groove width of the second portion 12, for example. The width W4 in the tyre axial direction of the connection portion 13 is defined as a distance in the tyre axial direction between a center position of the first small edge 16 in a length direction thereof and a center position of the second small edge 17 in a length direction thereof. In a further preferred embodiment, the width W4 of the connection portion 13 is in a range of from 0.10 to 0.25 times the width W3 of the middle land regions 7, for example. It is possible that the connection portion 13 configured as such improve the steering stability on a dry road surface and the on-snow performance in a good balance.

A width W5 (shown in FIG. 2 and the same applies hereinafter) in the tyre circumferential direction of the connection portion 13 is larger than the width W4 in the tyre axial direction of the connection portion 13, for example. The width in the tyre circumferential direction of the connection portion 13 is defined as a distance between the end in the tyre circumferential direction of the arcuate portion connecting between the first small edge 16 and the groove edge of the second portion 12 and the end in the tyre circumferential direction of the arcuate portion connecting between the second small edge 17 and the groove edge of the first portion 11. In a further preferred embodiment, the width W5 in the tyre circumferential direction of the connection portion 13 is in a range of from 1.3 to 2.0 times the width W4 in the tyre axial direction of the connection portion 13.

As shown in FIG. 2, the middle land regions 7 in this embodiment is provided with a plurality of short grooves 20 and a plurality of sipes 21, for example. Note that in this specification, the term "sipe" means an incision having a width less than 1.5 mm. It is more preferred that the width of each of the sipes is in a range of from 0.5 to 1.0 mm.

A length L5 in the tyre axial direction of each of the short grooves 20 is in a range of from 0.40 to 0.55 times the width W3 in the tyre axial direction of each of the middle land regions 7, for example. In a preferred embodiment, each of the short grooves 20 terminates at a position on a side of the second vertical edge (7*b*) of the center position in the tyre axial direction of each of the land regions. It is possible that the short grooves 20 configured as such improve the on-snow performance while maintaining the rigidity of the middle land regions 7.

It is preferred that a groove width W6 of each of the short grooves 20 is smaller than the width W4 in the tyre axial direction and the width W5 in the tyre circumferential direction of each of the connection portions 13, for example. It is possible that the short grooves 20 configured as such further improve the steering stability on a dry road surface.

Figure 4B:
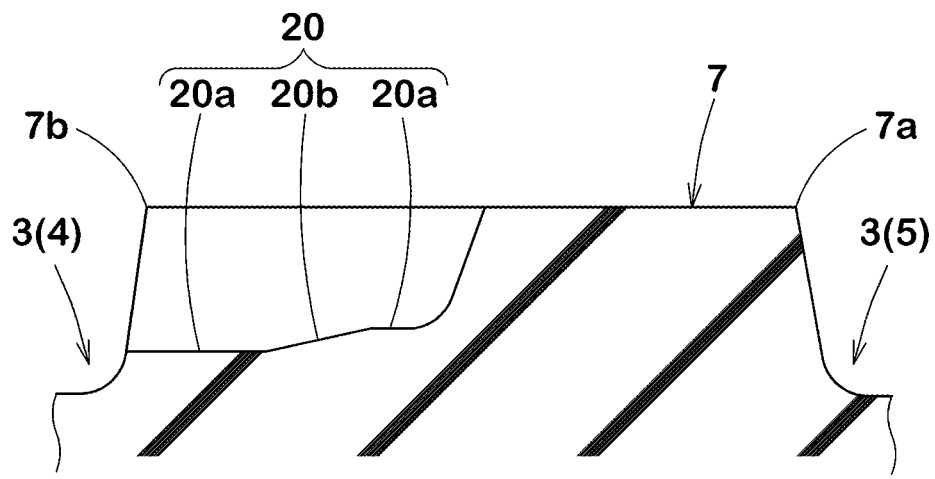
FIG. 4B is a cross-sectional view taken along B-B line of FIG. 2.

FIG. 4B is a cross-sectional view of one of the short grooves 20 taken along B-B line of FIG. 2. As shown in FIG.

4B, it is preferred that each of the short grooves 20 has a depth gradually decreasing from an end thereof on a side of the second vertical edge (7b) toward a terminating end thereof terminating within a respective one of the middle land regions 7. In a more preferred embodiment, each of the short grooves 20 has a changing depth portion (20b), in which a depth thereof changes by an inclination of a groove bottom thereof, arranged between a pair of constant depth portions (20a) each extending at a constant depth. With the short grooves 20 configured as such, it is made easy for snow in the grooves to be discharged by deformation of the land regions during running on a snowy road surface.

As shown in FIG. 2, each of the sipes 21 is arranged between a respective pair of the lateral groove 10 and the short groove 20 adjacent to each other in the tyre circumferential direction, for example. Each of the sipes 21 extends between the first vertical edge (7a) and the second vertical edge (7b), for example. It is preferred that the sipes 21 in this embodiment are inclined in a same direction with respect to the tyre axial direction as the first portions 11 and the second portions 12 of the lateral grooves 10. An angle of each of the sipes 21 with respect to the tyre axial direction is in a range of from 20 to 30 degrees, for example.

Figure 5A:
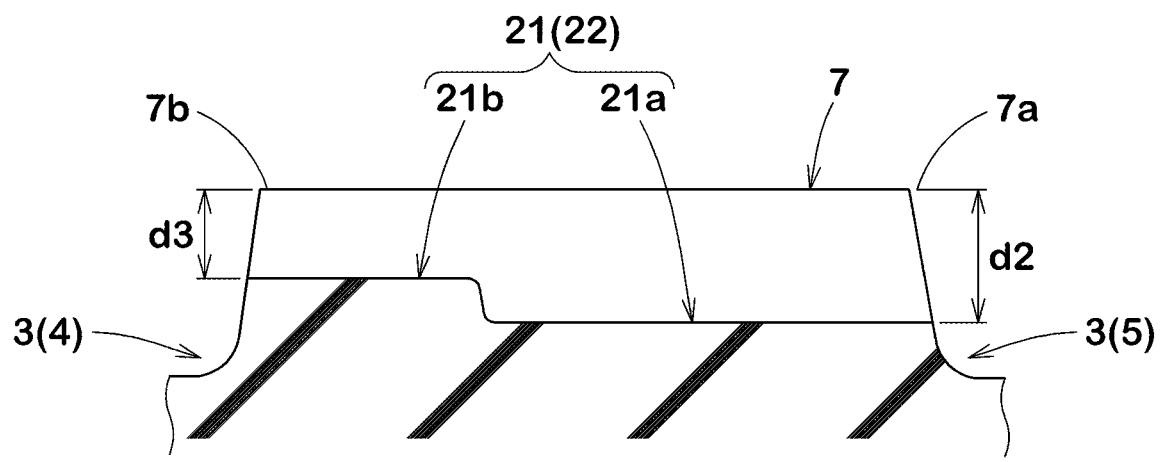
FIG. 5A is a cross-sectional view taken along c-c line of FIG. 2.
Figure 5B:
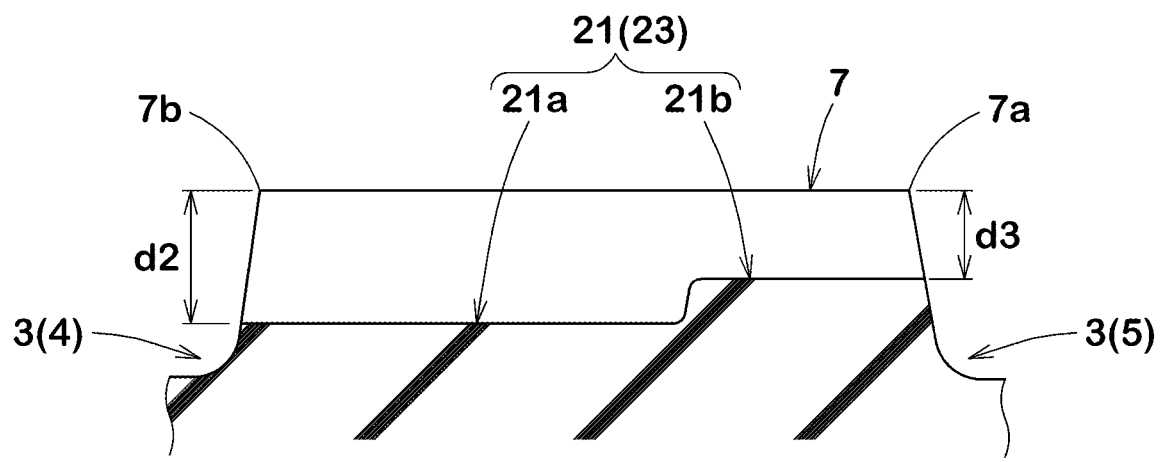
FIG. 5B is a cross-sectional view taken along D-D line of FIG. 2.

The sipes 21 include first sipes 22 and second sipes 23 having different depth distribution, for example. FIG. 5A is a cross-sectional view of one of the first sipes 22 taken along c-c line of FIG. 2. FIG. 5B is a cross-sectional view of one of the second sipes 23 taken along D-D line of FIG. 2. As shown in FIGS. 5A and 5B, it is preferred that each of the sipes 21 includes a main body portion (21a) and a shallow bottom portion (21b) having a smaller depth than that of the main body portion (21a). The depth (d2) of the main body portion (21a) is in a range of from 0.65 to 0.75 times the depth of each of the main grooves 3, for example. The depth (d3) of the shallow bottom portion (21b) is in a range of from 0.40 to 0.50 times the depth (d1) of each of the main grooves 3, for example. It is possible that the shallow bottom portions (21b) suppress the sipes 21 from opening excessively, improve the steering stability on a dry road surface, and suppress the uneven wear of the middle land regions 7.

The middle land regions 7 in this embodiment is provided with a plurality of kinds of the sipes 21 having the shallow bottom portions (21b) arranged at different positions in the tyre axial direction. Specifically, in each of the first sipes 22, the shallow bottom portion (21b) is arranged on a side of the first vertical edge (7a), for example. In each of the second sipes 23, the shallow bottom portion (21b) is arranged on a side of the second vertical edge (7b), for example. Thereby, the uneven wear of the middle land regions 7 is further suppressed.

Figure 6:
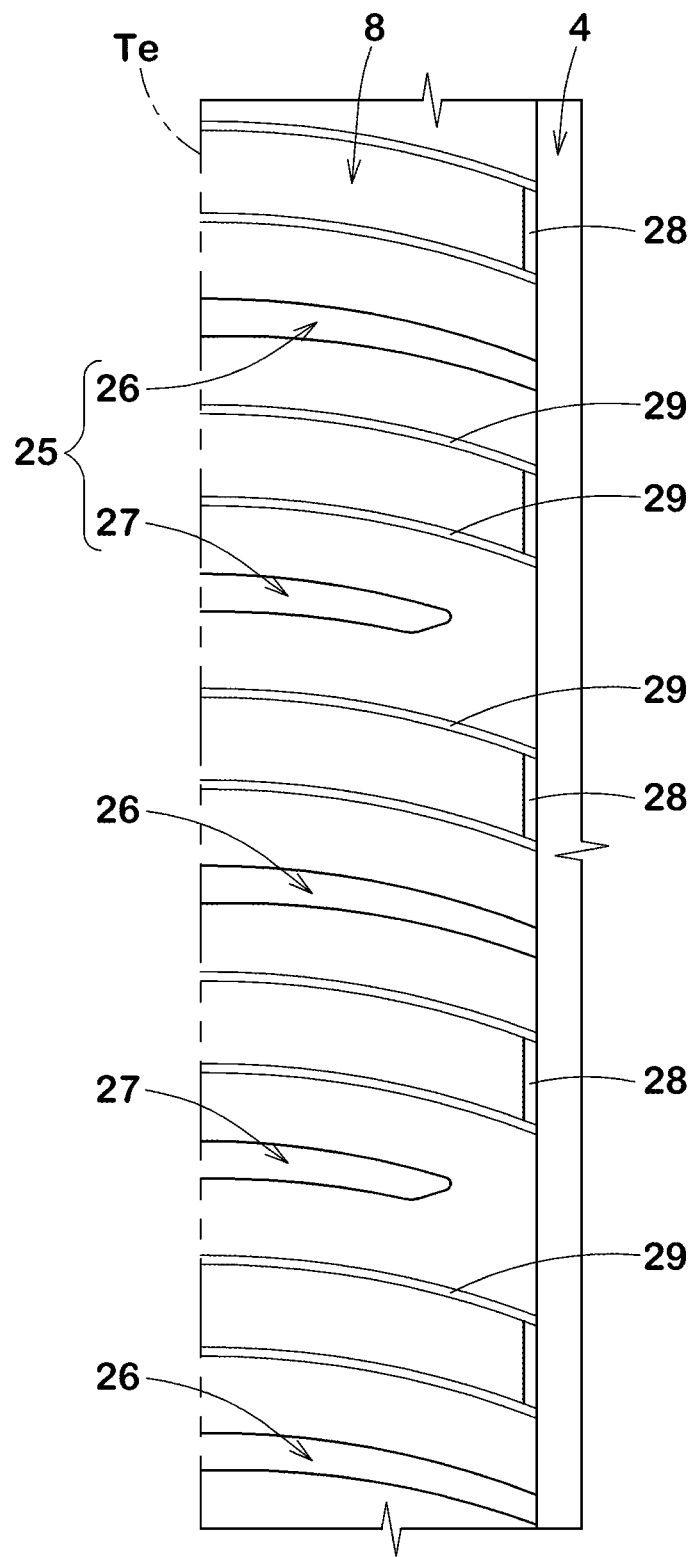
FIG. 6 is an enlarged view of one of shoulder land regions of FIG. 1.

FIG. 6 is an enlarged view of one of the shoulder land regions 8. As shown in FIG. 6, each of the shoulder land regions 8 is provided with a plurality of shoulder lateral grooves 25, shoulder sipes 29, and chamfered portions 28.

The shoulder lateral grooves 25 include first shoulder lateral grooves 26 each extending so as to connect between a respective one of the tread edges (Te) and its adjacent one of the shoulder main grooves 4, and second shoulder lateral grooves 27 each extending from a respective one of the tread edges (Te) to terminate within a respective one of the shoulder land regions 8, for example.

As shown in FIG. 1, it is preferred that an end portion on a side of a respective one of the shoulder main grooves 4 of each of the first shoulder lateral grooves 26 overlaps with a region obtained by extending a respective one of the short grooves 20 in a length direction thereof of its adjacent one of the middle land regions 7. Note that "extending a groove in a length direction thereof" means extending the groove while keeping a radius of curvature at an end portion thereof. Thereby, during running on a snowy road surface, the shoulder main grooves 4, the short grooves 20, and the first shoulder lateral grooves 26 cooperate together to form large snow blocks, therefore, it is possible that large snow shearing force is provided.

It is preferred that an end portion on a side of its adjacent one of the shoulder main grooves 4 of each of the second shoulder lateral grooves 27 overlaps with a region obtained by extending the second portion of a respective one of the lateral grooves 10 in a length direction thereof of its adjacent one of the middle land regions 7. Thereby, it is possible that the lateral grooves 10 are suppressed from being excessively open, therefore, the steering stability on a dry road surface is further improved.

As shown in FIG. 6, each of the shoulder sipes 29 extends so as to connect between a respective one of the tread edges (Te) and its adjacent one of the shoulder main grooves 4, for example. A plurality of the shoulder sipes 29 is arranged between each pair of the first shoulder lateral groove 26 and the second shoulder lateral groove 27 adjacent to each other in the tyre circumferential direction, for example. In this embodiment, two shoulder sipes 29 are arranged between each pair of the first shoulder lateral groove 26 and the second shoulder lateral groove 27. It is possible that the shoulder sipes 29 configured as such provide the frictional force on a snowy road surface.

Each of the chamfered portions 28 is formed such that a corner portion between the ground contacting surface of a respective one of the shoulder land regions 8 and a side surface thereof is recessed. The chamfered portions 28 in this embodiment are arranged at positions away from the shoulder lateral grooves 25, for example. It is preferred that a length in the tyre circumferential direction of each of the chamfered portions 28 is larger than a groove width of each of the shoulder lateral grooves 25, for example. Further, in a more preferred embodiment, the length in the tyre circumferential direction of each of the chamfered portions 28 is larger than the width W5 (shown in FIG. 2) in the tyre circumferential direction of the connection portion 13 of each of the lateral grooves 10. It is possible that the chamfered portions 28 configured as such suppress snow from being clogged in the shoulder main grooves 4 while suppressing the uneven wear of the shoulder land regions 8.

Each of the chamfered portions 28 in this embodiment is arranged so as to be connected with two shoulder sipes 29. More specifically, both end portions in the tyre circumferential direction of each of the chamfered portions 28 are connected respectively with one of the shoulder sipes 29. Such an arrangement of the chamfered portions 28 is helpful for increasing the effects described above.

As shown in FIG. 1, in a more preferred embodiment, a region obtained by extending each of the chamfered portions 28 in the tyre axial direction overlaps with an end portion of a respective one of the sipes 21 arranged in its adjacent one of the middle land regions 7. It is possible that the chamfered portions 28 configured as such suppress snow from being clogged in the shoulder main grooves 4 while suppressing the uneven wear of the shoulder land regions 8.

Figure 7:
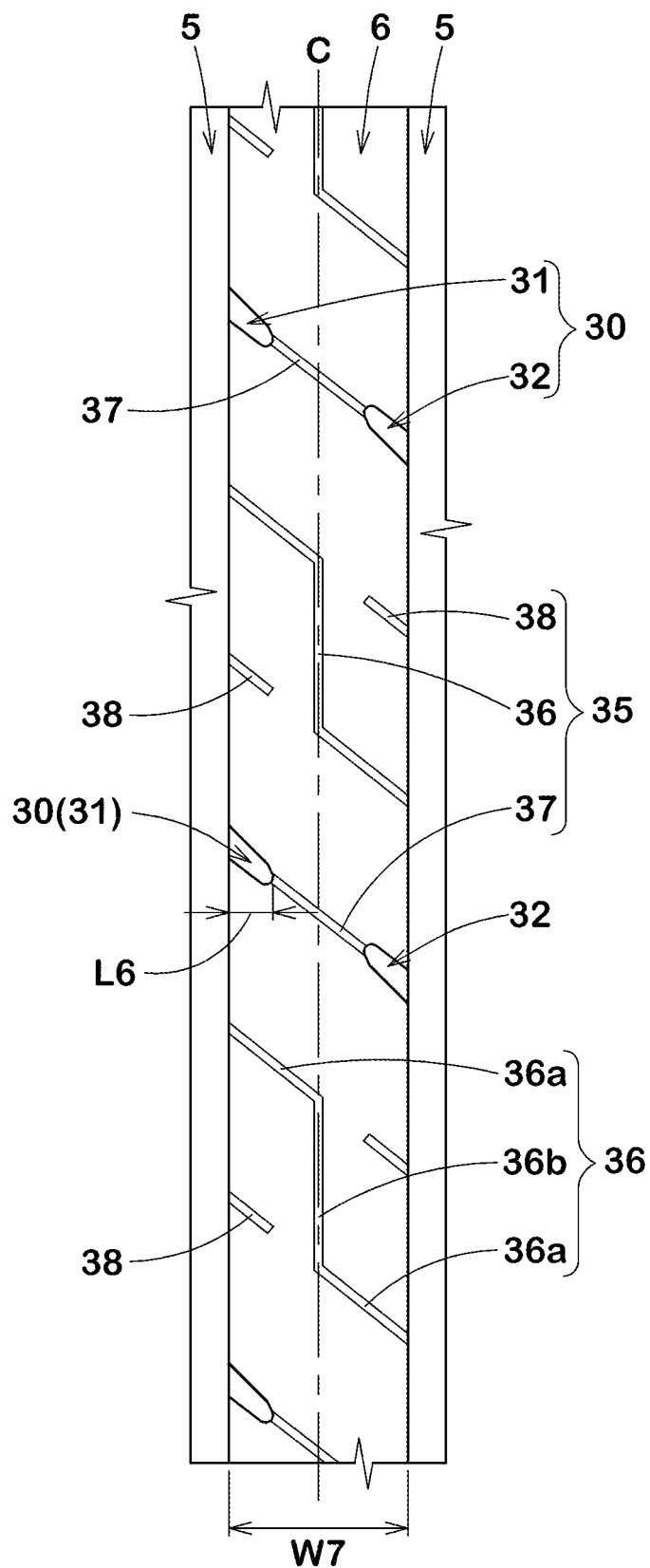
FIG. 7 is an enlarged view of a crown land region of FIG. 1.

FIG. 7 is an enlarged view of the crown land region 6. As shown in FIG. 7, the crown land region 6 is provided with a plurality of crown lateral grooves 30 and a plurality of crown sipes 35.

Each of the crown lateral grooves 30 extends from a respective one of the crown main grooves 5 to terminate within the crown land region 6, for example. Each of the crown lateral grooves 30 in this embodiment terminates without reaching a center position in the tyre axial direction of the crown land region 6, for example. It is preferred that a length L6 in the tyre axial direction of each of the crown lateral grooves 30 is smaller than the length L5 (shown in FIG. 2) in the tyre axial direction of each of the short grooves 20 arranged in the middle land regions 7. Specifically, it is preferred that the length L6 in the tyre axial direction of each of the crown lateral grooves 30 is in a range of from 0.20 to 0.30 times a width W7 in the tyre axial direction of the crown land region 6. It is possible that the crown lateral grooves 30 configured as such improve the steering stability on a dry road surface and the on-snow performance in a good balance.

The crown land region 6 in this embodiment is provided with first crown lateral grooves 31 each extending from one of the crown main grooves 5 and second crown lateral grooves 32 each extending from the other one of the crown main grooves 5.

In each pair of the first crown lateral groove 31 and the second crown lateral groove 32 adjacent to each other, the first crown lateral groove 31 and the second crown lateral groove 32 are arranged at positions relatively close to each other. In this embodiment, a region obtained by extending each of the first crown lateral grooves 31 in a length direction thereof overlaps with a respective one of the second crown lateral grooves 32. Thereby, the on-snow traction is increased.

The crown lateral grooves 30 are inclined with respect to the tyre axial direction, for example. In a preferred embodiment, they are inclined to the same direction with respect to the tyre axial direction as the first portion 11 (shown in FIG. 2) of the lateral grooves 10 of the middle land regions 7.

As shown in FIG. 1, an end portion on a side of a respective one of the crown main grooves 5 of each of the crown lateral grooves 30 in this embodiment overlaps with a region obtained by extending the first portion 11 in a length direction thereof of a respective one of the lateral grooves 10 of the middle land regions 7. Thereby, during running on a snowy road surface, the crown main grooves 5, the lateral grooves 10, and the crown lateral grooves 30 cooperate together to form large snow blocks, therefore, excellent on-snow performance is exerted.

As shown in FIG. 7, the crown sipes 35 include first crown sipes 36, second crown sipes 37, and third crown sipes 38, for example. Each of the crown sipes 35 is inclined to the same direction with respect to the tyre axial direction as the lateral grooves 10 of the middle land regions 7, for example.

Each of the first crown sipes 36 extends so as to cross the crown land region 6, for example. Each of the first crown sipes 36 in this embodiment has two mildly inclined portions (36a) and a steeply inclined portion (36b) arranged therebetween, for example. Each of the mildly inclined portions (36a) is connected with one of the crown main grooves 5 on one side or the other side and inclined with respect to the tyre axial direction. The steeply inclined portion (36b) is inclined at an angle with respect to the tyre axial direction larger than those of the mildly inclined portions (36a). In a preferred embodiment, the steeply inclined portion (36b) extends along the tyre circumferential direction. It is possible that the first crown sipes 36 configured as such improve the cornering performance on a snowy road surface.

Each of the second crown sipes 37 connects between a terminating end of the first crown lateral groove 31 and a terminating end of the second crown lateral groove 32 in each of the crown lateral grooves 30, for example. The second crown sipes 37 configured as such are helpful for increasing the on-snow traction.

Each of the third crown sipes 38 extends from either one of the crown main grooves 5 and terminates within the crown land region 6, for example. Each of the third crown sipes 38 in this embodiment terminates before reaching the center position in the tyre axial direction of the crown land region 6, for example. In a more preferred embodiment, a length in the tyre axial direction of each of the third crown sipes 38 is smaller than a length in the tyre axial direction of each of the mildly inclined portions (36a) of each of the first crown sipes 36.

It is preferred that each of the third crown sipes 38 overlaps with a region obtained by extending a respective one of the mildly inclined portions (36a) of the first crown sipes 36 in a length direction thereof, for example. The third crown sipes 38 configured as such together with the mildly inclined portions (36a) are helpful for increasing the on-snow traction.

While detailed description has been made of an embodiment of the present invention, the present invention can be embodied in various forms without being limited to the illustrated embodiment.

Working Examples (Examples)

Figure 8:
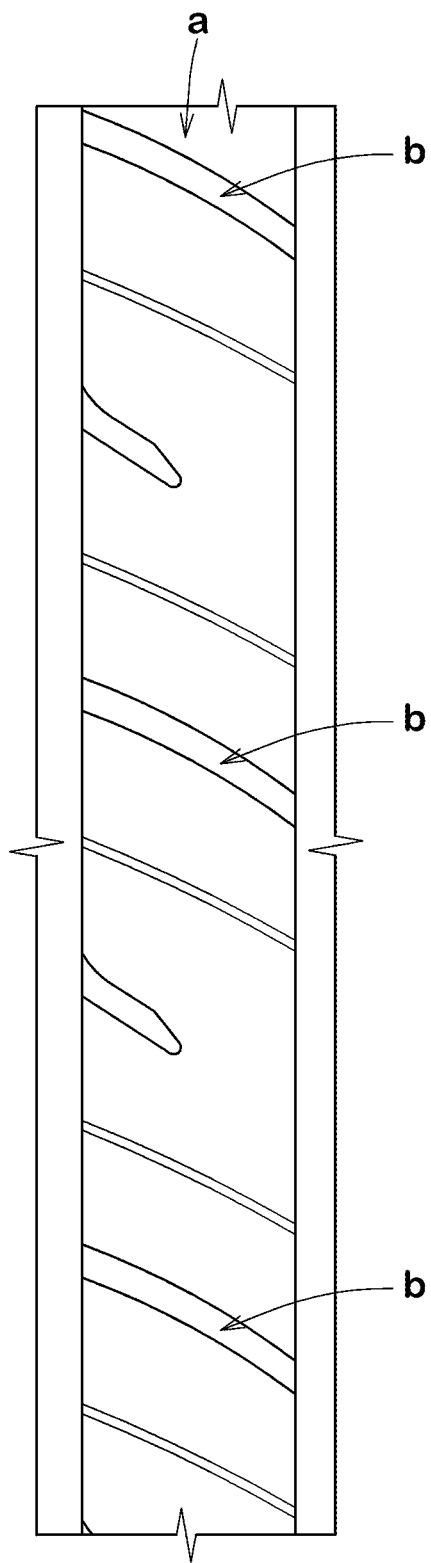
FIG. 8 is an enlarged view of one of the middle land regions of Reference.

Pneumatic tyres of size 215/60R16 having the basic tread pattern shown in FIG. 1 were made by way of test. As Reference, as shown in FIG. 8, tyres having middle land regions (a) provided with middle lateral grooves (b) not including the connection portions were made by way of test. Note that each of the middle lateral grooves (b) has a flat groove bottom and does not have the raised bottom portion shown in FIG. 4A. The tyres as the Reference were substantially the same as the tyre shown in FIG. 1 except for the configuration described above. Each of the test tyres was tested for the steering stability on a dry road surface and the on-snow performance. Common specifications of the test tyres and the test methods were as follows.

Tyre rim: 16×7.0 J

Tyre inner pressure: 250 kPa

Test vehicle: front wheel drive car with a displacement of 2500 cc

Tyre mounting position: all wheels

<Steering Stability on a Dry Road Surface>

While a test driver drove the test vehicle on a dry road surface, the steering stability was evaluated by the driver's feeling. The test results are indicated by an evaluation point based on the Reference being 100, wherein the larger the numerical value, the better the steering stability on a dry road surface is.

<On-Snow Performance>

While the driver drove the test car on a snowy road surface with the test tyres mounted thereon, the performance was evaluated by the driver's feeling.

The test results are indicated by an evaluation point based on the Reference being 100, wherein the larger the numerical value, the better the on-snow performance is.

The test results are shown in Table 1.

TABLE 1

| | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| FIG. showing middle land region | FIG. 8 | FIG. 1 | FIG. 1 | FIG. 1 | FIG. 1 | FIG. 1 | FIG. 1 | FIG. 1 | FIG. 1 | FIG. 1 |
| Presence (P) or absence (A) of Raised bottom portion | A | P | P | P | P | P | P | P | P | P |
| First portion length L3/Width W3 of Middle land region | — | 0.55 | 0.45 | 0.50 | 0.60 | 0.65 | 0.55 | 0.55 | 0.55 | 0.55 |
| Depth (d3) of Raised bottom portion/Depth (d1) of Lateral groove | — | 0.67 | 0.67 | 0.67 | 0.67 | 0.67 | 0.60 | 0.65 | 0.70 | 0.75 |
| Steering stability on a dry road surface [evaluation point] | 100 | 106 | 104 | 106 | 106 | 105 | 104 | 106 | 106 | 107 |
| On-snow performance [evaluation point] | 100 | 104 | 103 | 104 | 104 | 104 | 104 | 104 | 104 | 102 |

From the test results, it was confirmed that the steering stability on a dry road surface and the on-snow performance were improved in the tyres as Examples.

The invention claimed is:

1. A tyre comprising a tread portion, wherein
the tread portion is provided with a first vertical edge extending in a tyre circumferential direction, a second vertical edge extending in the tyre circumferential direction, and a land region including a ground contacting surface defined between the first vertical edge and the second vertical edge,
the land region is provided with a lateral groove extending so as to connect between the first vertical edge and the second vertical edge,
the lateral groove includes a first portion extending from the first vertical edge, a second portion extending from the second vertical edge, and a connection portion connecting the first portion and the second portion,
the connection portion is a portion between a first small edge and a second small edge,
the first small edge protrudes in the tyre circumferential direction from the first portion,
the second small edge protrudes toward an opposite side to the first small edge in the tyre circumferential direction,
a length in the tyre circumferential direction of each of the first small edge and the second small edge is smaller than a maximum groove width of the first portion and a maximum groove width of the second portion,
the connection portion has, in at least a part thereof, a raised bottom portion having a depth smaller than a depth at the first vertical edge and a depth at the second vertical edge of the lateral groove,
both the first small edge and the second small edge are positioned on a side of the second vertical edge with respect to a center position in a tyre axial direction of the land region,
an angle of each of the first small edge and the second small edge with respect to the tyre circumferential direction is in a range of 0 to 10 degrees,
the land region is arranged between a tyre equator and a tread edge, and the second vertical edge is positioned on a tread edge side of the land region,
the land region is provided with a short groove extending from the second vertical edge and terminating within the land region,
the second portion has a pair of groove edges extending from the second vertical edge,
the pair of groove edges is entirely inclined in a first direction with respect to the tyre axial direction, and
the short groove has a pair of groove edges inclined in the first direction with respect to the tyre axial direction.

2. The tyre according to claim 1, wherein
the first portion has, in at least a part thereof, a depth equal to that of the raised bottom portion.

3. The tyre according to claim 1, wherein
the short groove terminates at a position on the side of the second vertical edge of the center position in the tyre axial direction of the land region.

4. The tyre according to claim 1, wherein
the short groove has a depth gradually decreasing from an end thereof on the side of the second vertical edge toward a terminating end thereof terminating within the land region.

5. The tyre according to claim 1, wherein
the land region is provided with sipes each extending so as to connect between the first vertical edge and the second vertical edge.

6. The tyre according to claim 5, wherein
each of the sipes includes a main body portion and a shallow bottom portion having a depth smaller than that of the main body portion.

7. The tyre according to claim 6, wherein
the land region is provided with a plurality of kinds of the sipes having different positions in a tyre axial direction of the shallow bottom portions.

8. The tyre according to claim 1, wherein
the first small edge and a groove edge of the second portion is connected by an arcuate portion convex toward an outer side of the lateral groove, and
the second small edge and a groove edge of the first portion is connected by an arcuate portion convex toward an outer side of the lateral groove.

9. The tyre according to claim 1, wherein
the first portion and the second portion are connected with each other in a displaced manner from each other in the tyre circumferential direction, and
a displacement amount in the tyre circumferential direction between the first portion and the second portion is in a range of from 0.50 to 0.60 times a groove width of each of the first portion and the second portion.

10. The tyre according to claim 1, wherein
the depth of the raised bottom portion is in a range of from 0.60 to 0.75 times the depth of the lateral groove at the first vertical edge.

11. The tyre according to claim 1, wherein
a width in a tyre axial direction of the connection portion is larger than a maximum groove width of the first portion and a maximum groove width of the second portion.

12. The tyre according to claim 1, wherein
the first portion and the second portion are inclined in a same direction with respect to a tyre axial direction, and
an inclination angle of each of the first portion and the second portion is in a range of from 25 to 35 degrees with respect to the tyre axial direction.

13. A tyre comprising a tread portion, wherein
the tread portion is provided with a first vertical edge extending in a tyre circumferential direction, a second vertical edge extending in the tyre circumferential direction, and a land region including a ground contacting surface defined between the first vertical edge and the second vertical edge,
the land region is provided with a lateral groove extending so as to connect between the first vertical edge and the second vertical edge,
the lateral groove includes a first portion extending from the first vertical edge, a second portion extending from the second vertical edge, and a connection portion connecting therebetween,
the connection portion is a portion between a first small edge and a second small edge,
the first small edge protrudes in the tyre circumferential direction from the first portion,
the second small edge protrudes toward an opposite side to the first small edge in the tyre circumferential direction,
a length in the tyre circumferential direction of each of the first small edge and the second small edge is smaller than a maximum groove width of the first portion and a maximum groove width of the second portion,
the land region is provided with a short groove extending from the second vertical edge and terminating within the land region,
the tread portion includes a second land region adjacent to the land region on a side of the second vertical edge,
the second land region is provided with a first lateral groove extending so as to cross the second land region,
an end portion on a side of the land region of the first lateral groove overlaps with a region obtained by extending the short groove in a length direction thereof,
both the first small edge and the second small edge are positioned on a side of the second vertical edge with respect to a center position in a tyre axial direction of the land region,
an angle of each of the first small edge and the second small edge with respect to the tyre circumferential direction is in a range of 0 to 10 degrees,
the land region is arranged between a tyre equator and a tread edge, and the second vertical edge is positioned on a tread edge side of the land region,
the second land region is provided with a second lateral groove extending from an edge of the second land region on an opposite side to the land region and terminating within the second land region, and
an end portion on a side of the land region of the second lateral groove overlaps with a region obtained by extending the second portion of the lateral groove in a length direction thereof.

14. A tyre comprising a tread portion, wherein
the tread portion is provided with a first vertical edge extending in a tyre circumferential direction, a second vertical edge extending in the tyre circumferential direction, and a land region including a ground contacting surface defined between the first vertical edge and the second vertical edge,
the land region is provided with a lateral groove extending so as to connect between the first vertical edge and the second vertical edge,
the lateral groove includes a first portion extending from the first vertical edge, a second portion extending from the second vertical edge, and a connection portion connecting therebetween,
the connection portion is a portion between a first small edge and a second small edge,
the first small edge protrudes in the tyre circumferential direction from the first portion,
the second small edge protrudes toward an opposite side to the first small edge in the tyre circumferential direction,
a length in the tyre circumferential direction of each of the first small edge and the second small edge is smaller than a maximum groove width of the first portion and a maximum groove width of the second portion,
the land region is provided with a short groove extending from the second vertical edge and terminating within the land region,
the tread portion includes a third land region adjacent to the land region on a side of the first vertical edge,
the third land region is provided with a first lateral groove extending from one of edges on a side of the land region of the third land region and terminating within the third land region, and
a length in a tyre axial direction of the first lateral groove of the third land region is smaller than a length in the tyre axial direction of the short groove,
both the first small edge and the second small edge are positioned on a side of the second vertical edge with respect to a center position in a tyre axial direction of the land region,
an angle of each of the first small edge and the second small edge with respect to the tyre circumferential direction is in a range of 0 to 10 degrees, and
the land region is arranged between a tyre equator and a tread edge, and the second vertical edge is positioned on a tread edge side of the land region.

15. The tyre according to claim 14, wherein
the third land region is provided with a second lateral groove extending from the other one of the edges of the third land region and terminating within the third land region.

16. The tyre according to claim 15, wherein
in the third land region, a region obtained by extending the first lateral groove in a length direction thereof overlaps with the second lateral groove.

* * * * *